(12) United States Patent
Owen et al.

(10) Patent No.: US 12,478,457 B2
(45) Date of Patent: Nov. 25, 2025

(54) DENTAL BRACKET BONDING TRAY AND BRACKET LOADING QUALITY CONTROL SYSTEM

(71) Applicant: KLOwen Braces, Inc., Richardson, TX (US)

(72) Inventors: Brandon Owen, Lakeway, TX (US); Jerry Dean Metz, Flower Mound, TX (US)

(73) Assignee: KLOwen Braces, Inc., Richardson, TX (US)

( * ) Notice: Subject to any disclaimer, the term of this patent is extended or adjusted under 35 U.S.C. 154(b) by 507 days.

(21) Appl. No.: 18/120,125

(22) Filed: Mar. 10, 2023

(65) Prior Publication Data
US 2024/0299138 A1  Sep. 12, 2024

(51) Int. Cl.
*A61C 7/14* (2006.01)
*A61C 7/00* (2006.01)

(52) U.S. Cl.
CPC .............. *A61C 7/146* (2013.01); *A61C 7/002* (2013.01)

(58) Field of Classification Search
CPC ............................... A61C 7/146; A61C 7/002
USPC .............................................................. 433/3
See application file for complete search history.

(56) References Cited

U.S. PATENT DOCUMENTS

| | | | |
|---|---|---|---|
| 6,658,314 B1 | 12/2003 | Gothait | |
| 7,037,382 B2 | 5/2006 | Davidson et al. | |
| 7,500,846 B2 | 3/2009 | Eshed et al. | |
| 7,604,768 B2 | 10/2009 | Kritchman | |
| 2008/0233528 A1* | 9/2008 | Kim | A61C 7/146 433/2 |
| 2011/0091832 A1* | 4/2011 | Kim | B29C 64/00 700/119 |
| 2015/0064641 A1* | 3/2015 | Gardner | A61C 9/004 700/98 |
| 2016/0074139 A1* | 3/2016 | Machata | A61C 7/146 433/3 |
| 2016/0228214 A1* | 8/2016 | Sachdeva | G05B 19/4097 |
| 2018/0303583 A1* | 10/2018 | Tong | A61C 7/146 |
| 2019/0083204 A1* | 3/2019 | Owen | A61C 7/146 |
| 2019/0102880 A1* | 4/2019 | Parpara | G01N 21/95607 |
| 2020/0015938 A1* | 1/2020 | Owen | A61C 7/146 |
| 2021/0128275 A1* | 5/2021 | Suh | A61C 9/004 |
| 2021/0401546 A1* | 12/2021 | Gardner | A61C 7/002 |
| 2022/0338960 A1* | 10/2022 | Reising | A61C 7/002 |
| 2023/0005196 A1* | 1/2023 | Khaitov | G06F 30/17 |
| 2023/0049287 A1* | 2/2023 | Fisker | G06T 7/12 |
| 2024/0033042 A1* | 2/2024 | Giegerich | G16H 50/50 |
| 2024/0299138 A1* | 9/2024 | Owen | A61C 7/002 |

OTHER PUBLICATIONS

PCT International Patent Application No. PCT/US24/18707, International Search Report and Written Opinion of the International Searching Authority dated Jun. 26, 2024, 9 pages.

* cited by examiner

*Primary Examiner* — Matthew M Nelson
(74) *Attorney, Agent, or Firm* — Craig R. Miles; CR MILES P.C.

(57) ABSTRACT

A quality control system for maintaining quality control standards in the manufacture of indirect bonding trays and loading brackets into the indirect bonding trays.

20 Claims, 8 Drawing Sheets
(4 of 8 Drawing Sheet(s) Filed in Color)

FIG. 8 ined DENTAL BRACKET BONDING TRAY AND
BRACKET LOADING QUALITY CONTROL
SYSTEM

I. FIELD OF THE INVENTION

Generally, a quality control system and methods of maintaining quality control standards in the manufacture and loading of indirect bonding trays. Specifically, a quality control system and method of quality control of indirect bonding trays loaded with dental brackets by comparison of a digital model of the indirect bonding trays loaded with dental brackets to an image model of the indirect bonding trays loaded with dental brackets, wherein variances in the indirect bonding tray loaded with dental brackets from a corresponding orthodontic treatment plan can be recorded.

II. BACKGROUND OF THE INVENTION

Orthodontic brackets can be bonded to a patient's teeth by an orthodontist either through a direct method in which the orthodontist manually bonds each bracket one at a time to each of the patient's teeth or through an indirect method in which a bonding tray holds and concurrently seats a plurality of brackets to the patient's teeth. The indirect bonding tray constructed based on an orthodontic treatment plan including a bracket prescription includes tooth pockets conformed to receive the patient's teeth and corresponding bracket pockets configured to align the dental brackets with the patient's teeth through the use of the indirect bonding tray. When indirect bonding trays include defects in the tooth pockets and/or the bracket pockets or are loaded with dental brackets that do not conform to the bracket prescription, these variances lead to incorrect bracket placement, unintended arch wire bending or the need for dental bracket replacement or repositioning of the dental bracket during orthodontic treatment. These additional orthodontic treatment procedures can be clinically time consuming, expensive, and lead to prolonged treatment timelines.

There would be a substantial advantage in an inventive quality control system and a method of quality control in the system that identifies one or more of: a mismatch between the bonding tray under inspection and the corresponding orthodontic treatment plan of the patient, defects in the indirect bonding tray before the dental brackets are loaded into the bracket pockets, and thereafter, identifies variances between each dental bracket loaded into each bracket pocket of the indirect bonding tray and the dental bracket prescription for each bracket pocket of the indirect bonding tray. The inventive quality control system and the method of quality control in the system can reduce or eliminate variances in the structure of the indirect bonding tray and identify dental brackets incorrectly loaded into the bracket pockets of the indirect bonding tray. The inventive quality control system and the method of quality control in the system can lead to overall improvements bracket selection, bracket placement, arch wire bending and a reduction in orthodontic treatment procedures to replace or reposition dental brackets.

III. SUMMARY OF THE INVENTION

Accordingly, a broad object of particular embodiments of the invention can be a quality control system and a method of quality control in the system including one or more of: a processor communicatively coupled to a non-transitory computer readable media containing a program code executable to perform one or more of: receive digital images captured by one or more image capture devices of an indirect bonding tray under inspection; generate an image model of the indirect bonding tray based on the digital images; retrieve a digital model of the indirect bonding tray; compare the image model of the indirect bonding tray to the digital model of said indirect bonding tray; and record one or more variances between said image model of said indirect bonding tray to said digital model of the indirect bonding tray, whereby structural variances in the indirect bonding tray can be identified in comparison to an orthodontic treatment plan.

In particular embodiments, the program code can be further executed to associate a variance value with each of the one or more variances between the image model of the indirect bonding tray to the digital model of the indirect bonding tray; compare each variance value to a variance value threshold; and report each variance value which exceeds the variance value threshold, whereby the magnitude of structural variances in the indirect bonding tray can be identified in comparison to an orthodontic treatment plan.

In particular embodiments, the program code can be further executed to delimit comparison between the image model of the indirect bonding tray to the digital model of said indirect bonding tray to pre-defined structural features of said indirect bonding tray, wherein the pre-defined structural features of said indirect bonding tray can include one or more tooth pockets or one or more bracket pockets of the indirect bonding tray, whereby structural variances in the tooth pockets and/or bracket pockets in an indirect bonding tray can be identified in comparison to an orthodontic treatment plan can be identified.

In particular embodiments, the program can be further executable to generate light transmission values based on an amount of light passing through the indirect bonding tray; associate the light transmission values with said image model of said indirect bonding tray; compare the light transmission values with light transmission thresholds; and report the light transmission values which exceed said light transmission thresholds, whereby variances in the indirect bonding tray density can be identified in comparison to a indirect bonding tray density threshold. As examples, a split, fissure, or excess thinness between surfaces in the indirect bonding tray can be identified as structural defects.

Another broad object of particular embodiments of the invention can be a quality control system and a method of quality control in the system including a processor communicatively coupled to a non-transitory computer readable media containing a program code executable to perform one or more of: retrieve a digital model of an indirect bonding tray under inspection, wherein the digital model of the indirect bonding tray includes bracket pockets loaded with dental brackets each having a bracket identification mark; receive digital images of the indirect bonding tray under inspection, wherein the digital images including the bracket pockets loaded with the dental brackets each having the bracket identification mark; generate an image model based on the digital images of the indirect bonding tray including said bracket pockets loaded with said dental brackets each having said bracket identification mark; compare the image model of the indirect bonding tray including the bracket pockets loaded with the dental brackets each having the bracket identification mark to the digital model of the bonding tray loaded with the dental brackets each having the bracket identification mark; and record variances between the image model of the indirect bonding tray including the bracket pockets loaded with dental brackets each having the bracket identification mark and the digital model of said indirect bonding tray including the bracket pockets loaded with dental brackets each having said bracket identification mark, whereby variances in the dental brackets loaded into each bracket pocket of the indirect bonding tray can be identified in comparison to the dental bracket prescribed for each bracket pocket in an orthodontic treatment plan.

In particular embodiments, the program code can be further executed to select each dental bracket having a bracket identification mark corresponding to each bracket pocket in an indirect bonding tray based on a bracket prescription in an orthodontic treatment plan, whereby a bracket having a bracket identification mark optically perceivable by one or more image capture devices can be selected that most closely matches the bracket prescription can be selected from an available plurality of brackets each having an bracket identification mark, and wherein the plurality of brackets each having an bracket identification mark may be included in a dental bracket combinatory library.

Another broad object of particular embodiments of the invention can be provision of a method of quality control including one or more of: disposing an indirect bonding tray on an inspection platform; illuminating the indirect bonding tray disposed on the inspection platform with one or more illumination devices; capturing one or more images of the indirect bonding tray disposed on the inspection platform with one or more image capture devices; communicatively coupling a processor to a non-transitory computer readable media containing a program code; executing the program code executed under control of the processor to perform one or more of: generate a digital model of said indirect bonding tray based on orthodontic treatment data; receive digital images of the indirect bonding tray captured by the one or more image capture devices; generate an image model of the indirect bonding tray based on said digital images; compare the image model of said indirect bonding tray to the digital model of said indirect bonding tray; and record variances between said image model of said indirect bonding tray compared to said digital model of said indirect bonding tray, whereby structural variances in the indirect bonding tray can be identified in comparison to an orthodontic treatment plan. In particular embodiments, the program code can further function to compare an indirect bonding tray identification included in the digital model of the indirect bonding tray to the indirect bonding tray identification included in the image model, whereby variance in the indirect bonding tray identification of the indirect bonding tray under inspection can be identified in comparison to the indirect bonding tray identification included in the digital model of the indirect bonding tray.

In particular embodiments, executing the program code can further include displaying a graphical user interface on a display surface to depict one or more of: a graphical representation of the digital model of the indirect bonding tray on the display surface; a graphical representation of the image model of the indirect bonding tray on said display surface; an overlay of the digital model of the indirect bonding tray and the image model of the indirect bonding tray on the display surface; and visual indicia of the variances between the digital model of the indirect bonding tray overlaid with the image model of the indirect bonding tray on said display surface, whereby a user can view the variances between the digital model of the indirect bonding tray and the image model of the indirect bonding tray on a display surface.

In particular embodiments, executing the program code can further include selecting a plurality of dental brackets having a bracket identification mark optically perceivable by one or more image capture devices to fill each of the plurality of tooth pockets in an indirect bonding tray, and loading each of said bracket pockets of said indirect bonding tray with said plurality of dental brackets having said bracket identification mark. The method can further include executing the program code to perform one or more of: generate the digital model of the indirect bonding tray including the bracket pockets each including one of said plurality of dental brackets having an bracket identification mark; retrieve a digital model of the indirect bonding tray including the bracket pockets each including one of the plurality of dental brackets having the bracket identification mark; receive digital images of the indirect bonding tray on the inspection platform, the one or more digital images including the bracket pockets each loaded with one of the plurality of dental brackets having a bracket identification mark; generate an image model based on said digital images of said indirect bonding tray including said bracket pockets each loaded with one of said plurality of dental brackets having said bracket identification mark; compare the image model of the indirect bonding tray to the digital model of the bonding tray; and record variances between the bracket identification mark on each of said plurality of dental brackets in the image model of the indirect bonding tray corresponding to the bracket identification mark on each of the plurality of dental brackets in the digital model of said indirect bonding tray, whereby variances in the dental brackets loaded into each bracket pocket of the indirect bonding tray can be identified in comparison to the dental bracket prescribed for each bracket pocket in an orthodontic treatment plan.

Naturally, further objects of the invention are disclosed throughout other areas of the specification, drawings, photographs, and claims.

IV. BRIEF DESCRIPTION OF THE DRAWINGS

The patent or application file contains at least one drawing executed in color. Copies of this patent or patent application publication with color drawing(s) will be provided by the Office upon request and payment of the necessary fee.

V. DETAILED DESCRIPTION OF THE INVENTION

Generally, with reference to FIGS. 1 through 7, a quality control system (1) (also referred to as the "system") for maintaining quality control standards in the manufacture of indirect boding tray(s) (2) and the loading of brackets (3) into each indirect bonding tray (2). Embodiments of the quality control system (1) can include hardware and software to implement one or more of: an orthodontic treatment data exchange network (4); an indirect bonding tray manufacturing process (5); a bracket identification marking process (6); an indirect bonding tray design quality control process (7); a bracket selection process (8); and an indirect bonding tray bracket loading quality control process (9). The quality control system (1) ensures that the manufactured indirect bonding tray (2) has the correct structure of the tooth pockets (10) and the bracket pockets (11) and that the bracket pockets (11) are loaded with the correct brackets (3).

The Orthodontic Treatment Data Exchange Network. Generally, with reference to FIG. 1, particular embodiments of the invention can include an orthodontic treatment data exchange network (4) which can be distributed on one or more servers (12) which operably couple, directly or indirectly, one or more orthodontic service provider computing devices (13) and/or patient computing devices (14) to one or more vendor computing devices (15) by a public network (16), such as the Internet (16*a*), a cellular-based wireless network(s) (16*b*), or a local network (16*c*) (individually or collectively a "network"). The one or more vendor computing devices (15) operate to receive an orthodontic treatment data (17) from one more orthodontic service provider computing devices (13) and/or patient computing devices (14). The term "orthodontic service provider" means a business, person or an orthodontic treatment apparatus that generates orthodontic treatment data (17). The term "orthodontic treatment data (17)" means the information necessary to manufacture in whole or in part an orthodontic appliance (18) configured to deliver prospective forces of correction to move one tooth or teeth (19) in an upper dental arch (20) and/or a lower dental arch (21) of a patient (P) from instant malocclusion to a prospective occlusion, and without limitation to the breadth of the forgoing, can include one or more digital models (22) of the upper dental arch (20) or the lower virtual dental arch (21); an orthodontic bracket prescription (23) which identifies a bracket (3) for each tooth (19) to move each tooth (19) to the final position in the upper dental arch (20) or lower dental arch (21) of a patient (P), or other types of data which may include records, text documents, images, audio clips, software programs, or other types of data. The term "patient (P)" means a person obtaining orthodontic treatment data (17) to correct malocclusion of the teeth (19). The term "vendor" means a manufacturer, in whole or in part, of an orthodontic appliance (18) based on an orthodontic treatment data (17) and/or the dental bracket prescription (23). The term "orthodontic appliance (18)" means in whole or in part a device, either fixed or removable to the teeth (19), that applies force to the teeth (19) and their supporting structures to move the teeth (19) from an instant malocclusion toward a prospective occlusion, and without sacrificing the breadth of the foregoing, can include dental brackets (3) and/or indirect bonding trays (2) conformed to the orthodontic treatment data (17) including the orthodontic bracket prescription (23). While the terms "vendor computing device (15)" and "orthodontic service provider computing device (13)" and "patient computing device (14)" are utilized in association with certain embodiments, this is not intended to limit the scope of the invention to those particular embodiments, rather certain embodiments may generically include a first computing device, a second computing device through n . . . computing devices operably coupled or communicating within the orthodontic treatment data exchange network (4).

Figure 1:
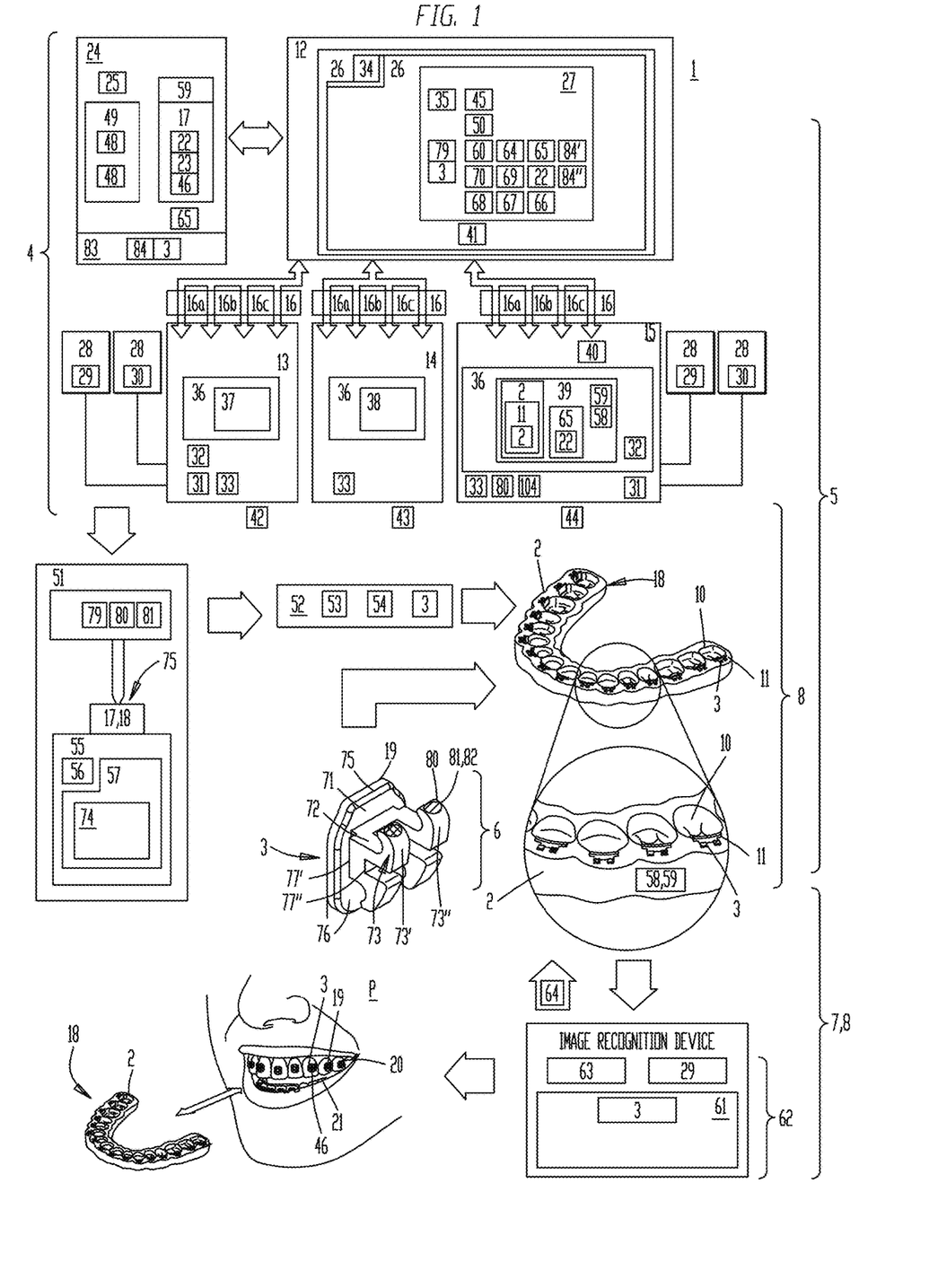
FIG. 1 is a block flow diagram of a particular embodiment of the quality control system in the manufacture and loading of indirect bonding trays.

In particular embodiments, the orthodontic treatment data exchange network (4) can further include a records database (24) from which records (25) can be retrieved by a request from any one of the orthodontic service provider computing devices (13), the patient computing devices (14) or the vendor computing devices (15) to the extent the computing devices have network (4) or record database (24) access privileges to retrieve records (25) including, but not limited to, records (25) including the orthodontic treatment data (17), digital models (22) or an orthodontic bracket prescription (23).

Again, with primary reference to FIG. 1, depicting illustrative computer hardware, network elements, including a one more servers (12) having a non-transitory computer readable media (26) containing a program code (27) which can be utilized to practice embodiments of the system (1); however, it is not intended that embodiments of the invention be practiced in only in a wide area network (WAN) computing environments or only in local area network (LAN) computing environments, but rather the invention can be practiced in WAN or LAN computing environments or in distributed computing environments where functions or tasks are performed by remote processing devices that are linked through the network (4). In a distributed computing environment, program modules may be located in both WAN or LAN non-transitory computer readable media (26).

Also, while a preferred embodiment of the invention may described in the general context of a program code (27) providing computer-executable instructions such as an application program and program modules which utilize routines, programs, objects, components, data structures, or the like, to perform particular functions or tasks or implement particular abstract data types, or the like, being executed by the computer hardware and network elements, it is not intended that any embodiments of the invention be limited to a particular set of computer-executable instructions or protocols.

Again, with primary reference to FIG. 1, the orthodontic service provider computing devices (13) or patient computing devices (14) or vendor computing devices (15), can be configured to connect with one or more server computers (12) through the public network (16), such as the Internet (16*a*), or one or more cellular-based networks (16*b*), or one or more local area networks (16*c*) to transfer orthodontic treatment data (17). The one or more orthodontic service provider computing devices (13), the patient computing devices (14), or the one or more vendor computing devices (15) can, as examples, take the form of one or more limited-capability computers designed specifically for navigation in the system (1), or general capability computers, such as, desk top computers, hand-held computers, such as personal computers, slate or pad computers, cell phones, personal digital assistants, or the like.

In addition, each of the service provider computing devices (13), or patient computing device (14), or the one or more vendor computing devices (15), can further include peripheral input devices (28), such as: an image capture device (29), a video camera, a web camera, a mobile phone camera, a video phone, or the like, and an audio capture device (30), such as, microphones, speaker phones, computer microphones, or the like. The audio capture device (30) can be provided separately from or integral with the image capture device (29). The image capture device (29) and the audio capture device (30) can be integral or connected to a vendor computing device (15), orthodontic service provider computing device (13), or patient computing device (13) by an image capture interface (31) and an audio capture interface (32).

Again, with primary reference to FIG. 1, each of the one or more orthodontic service provider computing devices (13), or the one or more patient computing devices (14), or the one or more vendor computing devices (15), the can include an Internet browser (33) (also referred to as a "browser") such as Microsoft's Internet Explorer®, Google Chrome®, Mozilla®, Firefox®, or the like, which functions to download and render multimedia content that is formatted in "hypertext markup language" (HTML). In this environment, a server computer (12) can include a processor (34) communicatively coupled to a non-transitory computer readable medium (26) containing a program code (27) executed in part to implement the most significant portions of a graphical user interface module (35) retrievable for display on a display surface (36) based on access privileges of the corresponding orthodontic service provider computing device (13) or patient computing device (14) or vendor computing device (15), as one or more orthodontic service provider interfaces (37) or as one or more patient interfaces (38) or as one more vendor user interfaces (39). As to these embodiments, the program code (27) including the graphical user interface module (35) which implements the one or more vendor user interface(s) (39), the one or more orthodontic service provider interface (37), and the one or more patient user interface (38) can be resident in one or more servers (12) and/or the one or more vendor computing devices (15), the one or more orthodontic service provider computing devices (13), and the one or more patient computing devices (14). The browser (33) can operate to display downloaded system content (40) and to relay user inputs (41) back to the one or more server computers (12). The one or more servers (12) can respond by formatting new screen displays for the respective vendor user interface (39), orthodontic service provider user interface (37), and patient user interface (38) and downloading them for display on the display surface (36) of the one or more vendor computing devices (15), orthodontic service provider computing devices (14), or patient computing devices (15).

In other embodiments, the one or more servers (12) can be used primarily as sources of system content (40), with primary responsibility for implementing the vendor user interface (39), the orthodontic service provider user interface (37), or patient user interface (38) being placed upon each of the one or more vendor computing device (15), orthodontic service provider computing device (13) or patient computing device (14). As to these embodiments, each of the one or more vendor, orthodontic service provider, or patient computing devices (13, 14, 15) can contain and run the appropriate portions of the program code (27) implementing the vendor, orthodontic service provider, or patient user interfaces (37, 38, 39). An orthodontic service provider user (42) or a patient user (43) or a vendor user (44), may enter commands and information into a corresponding one or more orthodontic service provider computing devices (13) or patient computing devices (14) or one or more vendor computing devices (15) through peripheral input devices (28) such as a keyboard or a pointing device, such as, a mouse; however, any method or device that converts user action into commands and information can be utilized including, but not limited to: a microphone, joystick, game pad, touch screen, or the like.

The orthodontic treatment data (17) can be transmitted from the one or more servers (12), the orthodontic service provider computing device (13), or the patient computing device (14) via the network (4) to the vendor computing device (15). The orthodontic treatment data (17) can include the information necessary to in whole or in part manufacture an orthodontic appliance (18) configured to deliver prospective forces of correction to move one or more teeth (19) from instant malocclusion in the upper dental arch (20) or the lower dental arch (21) to a prospective occlusion.

Digital Model Database. Now, with primary reference to FIG. 1, particular embodiments of the program code (27) can include a digital model generation module (45) which can be executed to process the orthodontic treatment data (17) to generate digital models (22) of one or more of: an upper dental arch (20) or lower dental arch (21); bracket bonding locations (46) on one or more teeth (19) in the upper dental arch (20) or the lower dental arch (21); dental brackets (3) selected based on prospective bracket bonding locations (46) and prospective tooth movement from a bracket combinatorial library (47); an indirect bonding tray (2) including tooth pockets (10) configured to receive the corresponding teeth (19) in the upper dental arch (20) or lower dental arch (21) and bracket pockets (11) to receive the selected brackets (3) at positions corresponding to the bracket bonding locations (46). The digital models (22) generated by the digital model generation module (45) can be retrievably stored in industry-standard file formats as digital model files (48) in a digital model database (49).

Figure 2:
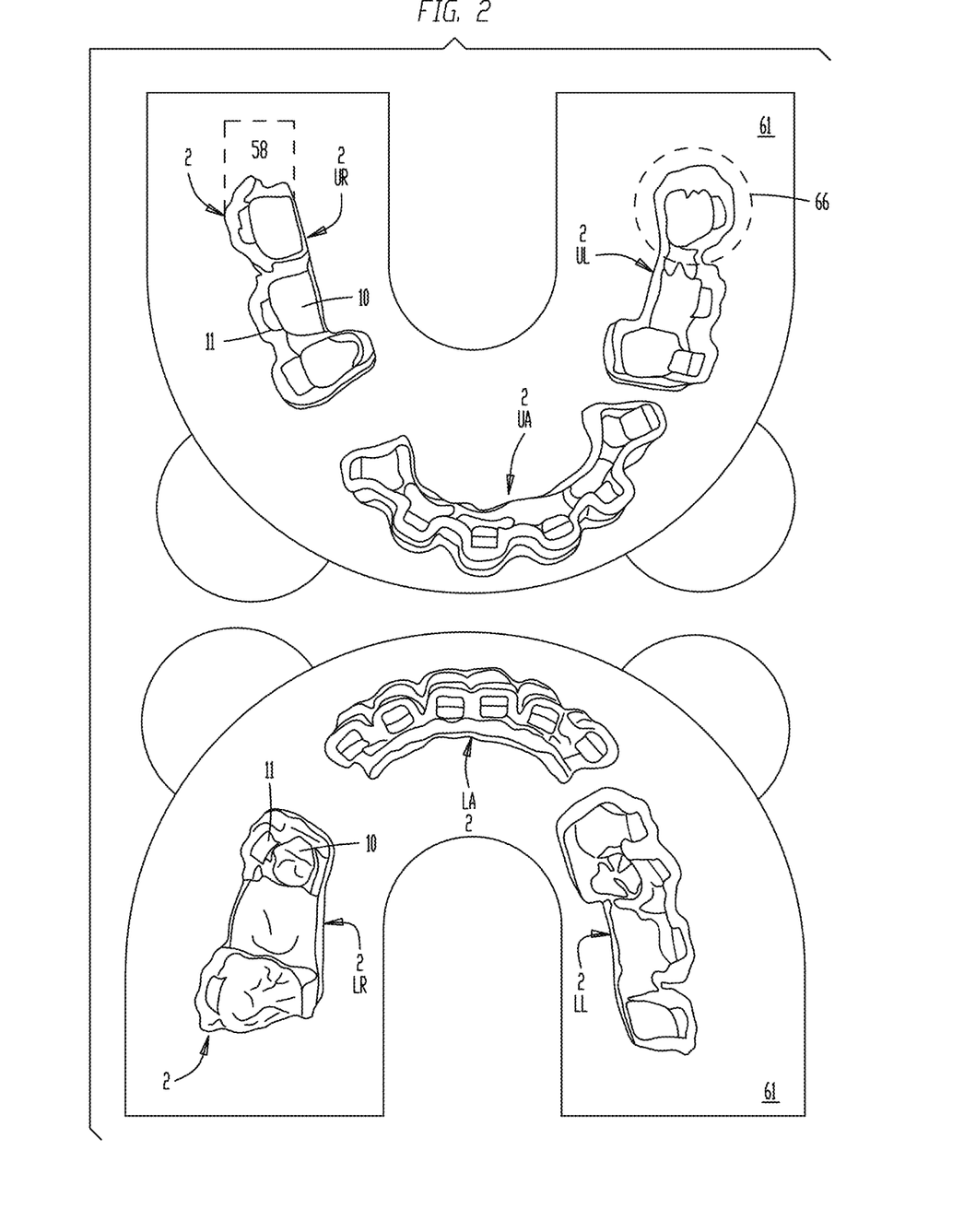
FIG. 2 illustrates an indirect bonding tray disposed on an inspection platform for quality control inspection.
Figure 3:
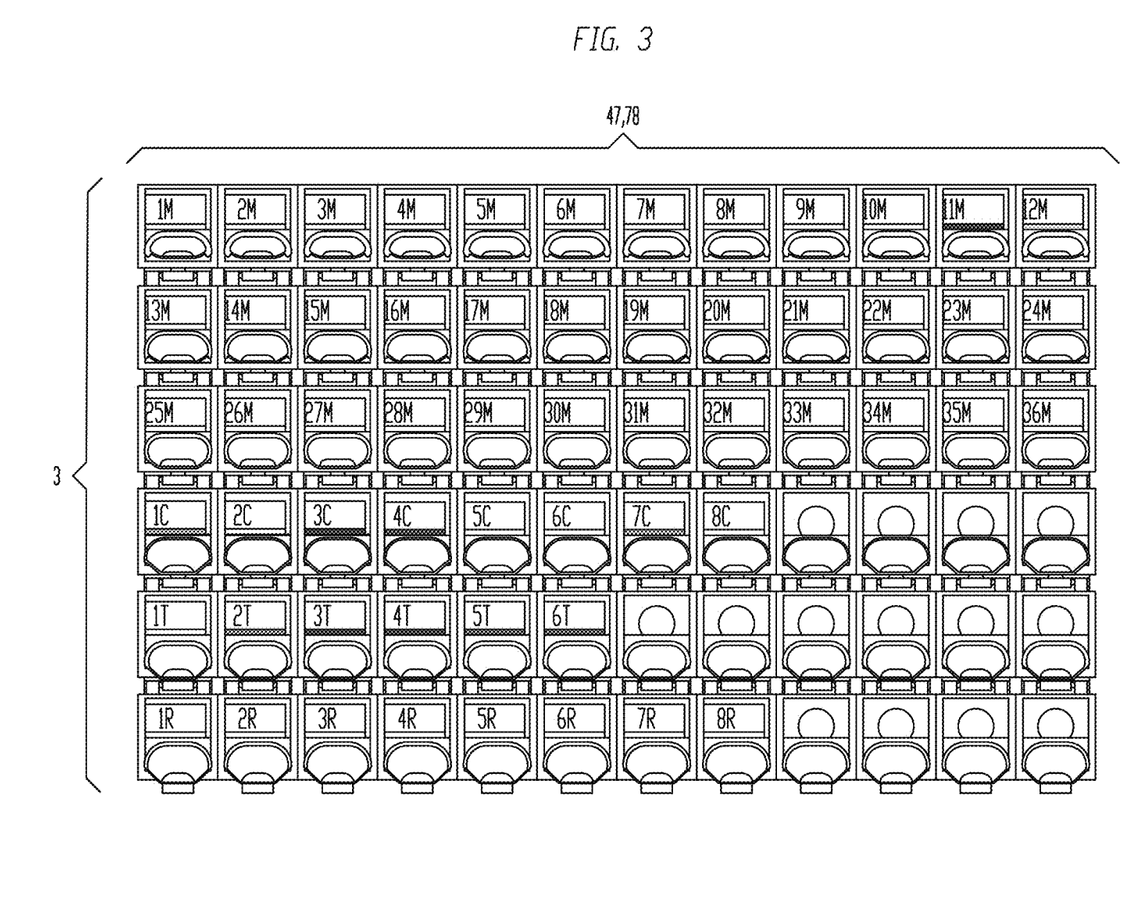
FIG. 3 illustrates a dental bracket combinatory library including dental brackets each having a bracket identification mark optically perceivable by one or more image capture devices.
Figure 4:
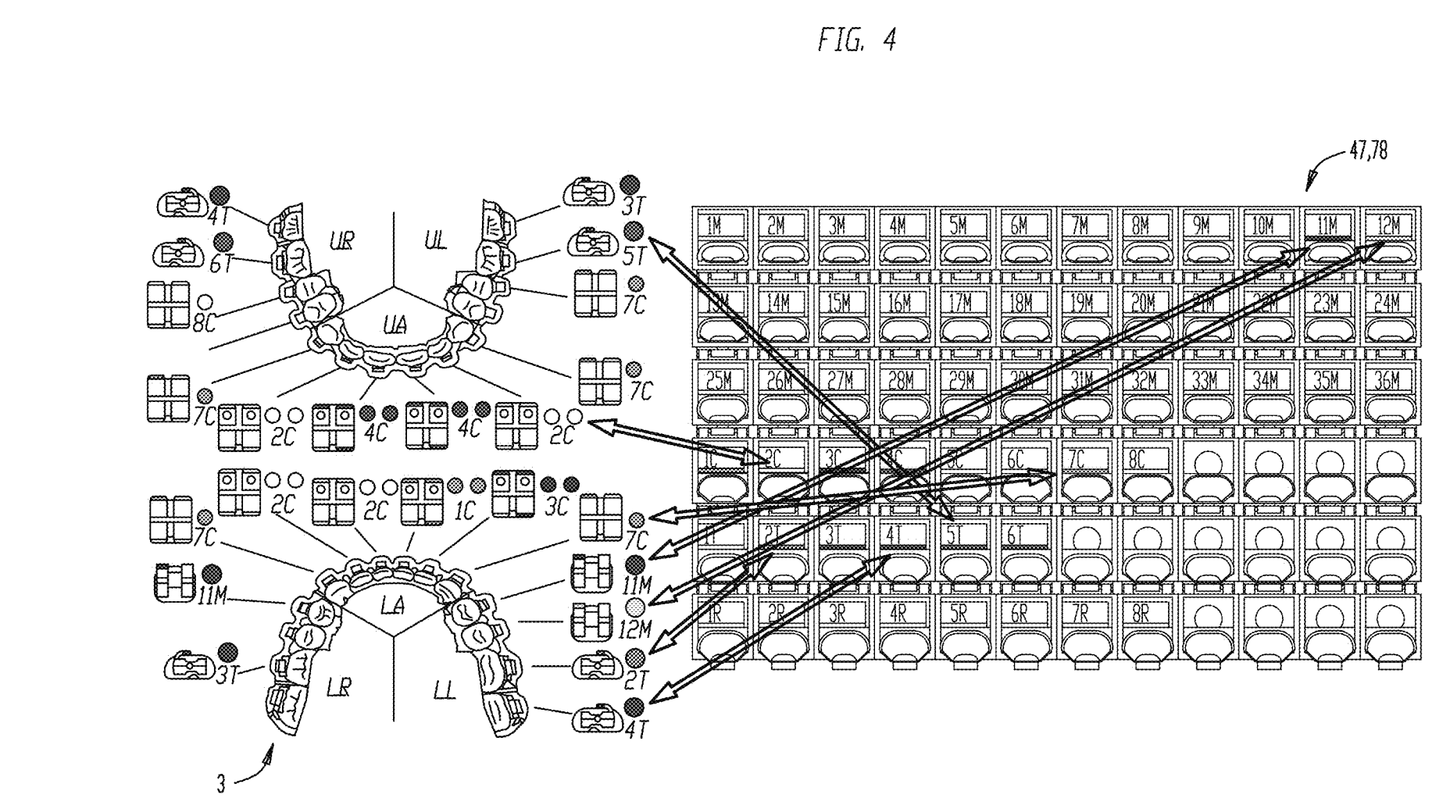
FIG. 4 illustrates the selection and placement of dental brackets having a bracket identification mark from a dental bracket combinatory library into a digital model of the indirect bonding tray based on a bracket prescription of a patient.
Figure 6:
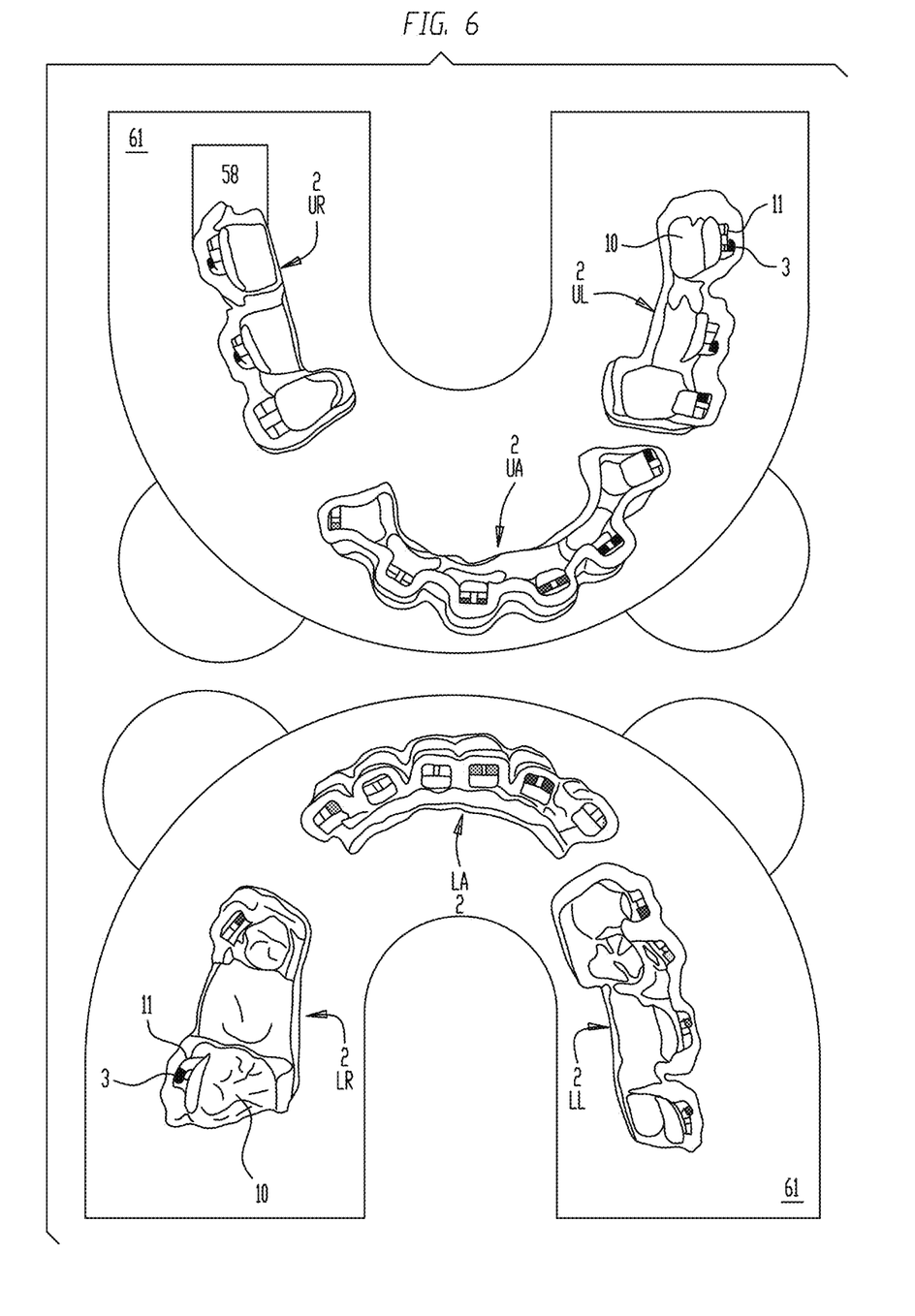
FIG. 6 illustrates an indirect bonding tray loaded with dental brackets each having a bracket identification mark optically perceivable by one or more image capture devices disposed on an inspection platform for quality control inspection.

Three-Dimensional Build Up Process. Again, with primary reference to FIG. 1, in particular embodiments, the digital models (22) can be retrieved from the digital model database (49). The digital models (22) can be analyzed by an indirect bonding tray production module (50) to generate computer executable instructions to operate a three-dimensional materials deposition apparatus (51) in an additive build up process to produce tangible models (52) including one or more of: an upper dental arch model (53); a lower dental arch model (54); an indirect bonding tray (2) whether in one piece or in bonding tray segments (as shown in the examples of FIGS. 2 and 6 UR, UA, UL, LR, LA, LL) having tooth pockets (10) to receive one or more teeth (19) corresponding to the upper dental arch (20) or the lower dental arch (21) and bracket pockets (11) to receive brackets (3) based on the orthodontic treatment data (17) which can be selected from a bracket combinatorial library (47). The term "additive build up process" for the purposes of this invention means any process of layering or combining materials to produce a three-dimensional object, and without limiting the breadth of the forgoing, particular embodiments of the additive build up can but need not necessarily include the conventional process referred to as three-dimensional printing ("3D printing") in which the three-dimensional object can be created from a digital model (22) using a materials printer laying down successive layers of a build material or build material and a binder liquid. The term "tangible model" for the purposes of this invention means any configuration of a three-dimensional object and without limiting the breadth of the forgoing includes tangible models of the upper dental arch (20) or lower dental arch (21) or an indirect bonding tray (2).

Again, with primary reference to FIG. 1, particular embodiments can include a three-dimensional materials deposition apparatus (51) including a materials deposition apparatus controller (55) adapted to receive and contain one or more of: the digital models (22) of the upper dental arch (20), the digital model (22) of lower dental arch (21), and the digital model (22) of the bonding tray (2). The controller can further include a controller processor (56) communicatively coupled to a three-dimensional object production application (57). The digital models (22) can be stored in industry-standard file formats as digital model files (48), which can be transmitted electronically and interpreted by the three-dimensional object production application (57) to provide computer program instructions executable to implement functions necessary to control the three-dimensional materials deposition apparatus (51) in the additive build up process to produce tangible models (52) of one or more of: an upper dental arch model (53), a lower dental arch model (54) and an indirect bonding tray (2). The materials deposition apparatus controller (55) can take the form of a general-purpose computer, special purpose computer or other programmable data processing apparatus.

As to particular embodiments of the invention, the materials deposition apparatus controller (55) can run the three-dimensional object production application (57) which analyzes one or more of the digital models (22), accepts parameter and preference input from the vendor user (44), performs a series of detailed calculations and transmits to the three-dimensional materials deposition apparatus (51) commands and provides information needed to produce tangible models (52) of the upper dental arch (20), the lower dental arch (21) and/or the bonding tray (2) or bonding tray segments (UR, UA, UL, LR, LA, LL). A three-dimensional materials deposition apparatus (51) suitable for use with embodiments can be a Form 2350R material deposition apparatus available from Formlabs, Inc., or a three-dimensional printer assembly as described in U.S. Pat. No. 7,037,382, hereby incorporated by reference herein, or same or similar apparatus.

Particular embodiments of the three-dimensional materials deposition apparatus (51) can, but need not necessarily, comprise a three-dimensional printer having an array of jet type print heads which deposit a binder liquid onto successive layers of a build material. Where the binder liquid combines with the build material, typically, a powder build material that reacts with the binder liquid and hardens. By controlling the placement of binder liquid from these print heads, the configuration of the tangible models (52) can be physically reproduced by an additive build up process.

In particular embodiments, the build material can comprise methacrylic acid esters, or a combination of methacrylic acid esters and phosphine oxides as a photoinitiator which exposed to ultraviolet light initiates hardening of the methacrylic acid esters, for example, Dental SG Resin liquid available from Formlabs, Inc. A tangible model of the present invention including tangible embodiments of the upper dental arch (20), the lower dental arch (21), and bonding tray (2) or bonding tray segments (UR, UA, UL, LR, LA, LL) can be produced from these build materials using, for example, a three-dimensional printing system similar to various embodiments of U.S. Pat. Nos. 6,658,314, 7,604,768 and 7,500,846, each hereby incorporated by reference.

In particular embodiments, the build material can comprise a plastic filament. The plastic filament can, for example, comprise acrylonitrile butadiene styrene (ABS) or polylactic acid (PLA) provided as strands of filament of about one millimeter to about three millimeters in diameter that unwind from a coil or spool. The three-dimensional materials deposition apparatus (51) can comprise a fused deposition modeling or, more generally, fused filament fabrication printer. The plastic filament can be supplied to a print head with an extrusion nozzle, such as, a gear which pulls the plastic filament off the spool and into the extrusion nozzle. The extrusion nozzle can be adapted to turn its flow on and off. The extrusion nozzle (or an upstream portion of the print head) is heated to melt the plastic filament as it is passed into, or through, the extrusion nozzle so that it liquefies. The pointed extrusion nozzle deposits the liquefied material in ultrafine lines (for example, in lines that are about 0.1 millimeters across).

As to particular embodiments, the build material(s) used in the three-dimensional printing (or other forming or fabrication process) of the tangible models (52) and bonding trays (2) or bonding tray segments (UR, UA, UL, LR, LA, LL), when cured can, but need not necessarily, have Shore A hardness which falls in a wide range of Shore A hardness. The Shore A hardness can, as an example, be between about 50 to about 90. Similarly, the tensile strength of the matrix material can be between about $1.0 \times 10^6$ Pa to about $5.0 \times 10^6$ Pa. However, the above illustrative Shore A hardness or tensile strength is not intended to preclude embodiments which fall outside of these ranges.

Bonding Tray Quality Control Process. Now, with primary reference to FIGS. 1 and 2, in particular embodiments, an indirect bonding tray (2) produced in the indirect bonding tray manufacturing process (5) whether printed, formed or fabricated can include one or more tooth pockets (10) and corresponding one or more bracket pockets (11). The tooth pockets (10) can have tooth pocket walls configured to correspondingly receive and engage one or more teeth (19). The bracket pockets (11) have bracket pocket walls configured to correspondingly receive and hold one or more of brackets (3) in positions and orientation that when the teeth (19) of the patient (P) engage the tooth pockets (10) the brackets can be transferred and fixedly seated to the teeth (19) at the bracket bonding locations (46) specified in the orthodontic treatment data (17).

In particular embodiments, each indirect bonding tray (2) can be imprinted, tagged or otherwise associated with a bonding tray identification (58) which can include a patient identifier (59) or other identifier that can be correlated with the patient identifier (59) of a patient (P). The patient identifier (59) can be correlated with the orthodontic treatment data (17) and digital model (22) of the indirect bonding tray (2). As examples, the bonding tray identification (58) can comprise one or more of: a barcode, a Q code, an alpha or numeric or alphanumeric code, a radiofrequency identification tag, or the like. By vendor user (44) indications in the vender user interface (39) including the patient identifier (59), a bonding tray quality control module (60) of the program code (27) can be activated to retrieve the orthodontic treatment data (17) and the digital model (22) of the indirect bonding tray (2) associated with the patient (P). The indirect bonding tray (2), or bonding tray segments (UR, UA, UL, LR, LA, LL) of patient (P) can be loaded onto an inspection platform (61) and the bonding tray identification (58) can be scanned, read or otherwise reported, whether automatically or manually, and compared to the patient identifier (59). If the bonding tray identification (58) does not correlate with the patient identifier (59), the bonding tray quality control module (60) can function to provide notice to the vendor user (44) that the bonding tray identification (58) does not correlate with the retrieved patient identifier (59).

If the bonding tray identification (59) correlates with the patient identifier (58), the bonding tray quality control module (60) can provide notice that the bonding tray identification (58) correlates with the retrieved patient identifier (59) and the bonding tray (2) can proceed to a bonding tray three-dimensional surface inspection (62). One or more illumination devices (63) can be utilized to illuminate the bonding tray on the inspection platform (61). Illumination enhances the indirect bonding tray (2) surface structure including the structure of the tooth pockets (10) and the bracket pockets (11). As an example one or more illumination devices (63) can direct light at one or more angles of incidence to the indirect bonding tray (2) to provide illumination that sufficiently enhances the bonding tray structure to allow one or image capture devices (29) (for example a camera, video camera, web camera, mobile phone camera, video phone) to obtain a digital image (64) of the indirect bonding tray (2) under inspection. The digital image (64) composed of pixels can be converted by the bonding tray quality control module (60) into a continuous spatially distributed image model (65) that can be compared to the digital model (22) of the indirect bonding tray (2). The bonding tray quality control module (60) can then function to compare the image model (65) to the digital model (22) of the indirect bonding tray (2) and report variances between the image model (65) and the digital model (22). In particular embodiments, a graphical representation of image model (65) of the indirect bonding tray (2) can be depicted overlaying the digital model (22) of the indirect bonding tray (2) on the display surface (36) of a vendor computing device (15). The variances in the overlaid models (22) can be highlighted. The term "highlighted" means generating visual indicia associated with the areas of variance between the image model (65) of the indirect bonding tray (2) and the digital model (22) of the indirect bonding tray (2). As examples, visual indicia can include one or more of: shade, color, pointer, brackets, cross hatch, stipple, or the like that visually emphasizes the area of variance between the digital model (22) and the image model (65) of the indirect bonding tray (2) under inspection. In particular embodiments, the bonding tray quality control module (60) can be programmed to limit the scope of comparison to one or more indirect bonding tray features (66) and generate a variance value (67) for each variance between the image model (65) and the digital model (64) of the indirect bonding tray (2). The variance value(s) (67) can be compared to a variance value threshold (68) associated with each bonding tray feature (66). A variance value (67) in excess of the variance value threshold (68) can be reported to allow the vendor user (44) to make a final determination as to whether the bonding tray (2) passes or fails the bonding tray inspection, or the bonding tray quality control module (60) can automatically report that the indirect bonding tray (2) fails the bonding tray inspection. In particular embodiments, the indirect bonding tray (2) can be illuminated at an angle which allows the image model (65) to include light transmission values (69) corresponding to the amount of light passing through the indirect bonding tray (2) structure based on comparative pixel brightness in the image model (65). Visible light transmission values (69) can provide a measure of the indirect bonding tray (2) structure density (p). The visible light transmission values (69) can be compared to visible light transmission value thresholds (70) to access whether the indirect bonding tray (2) structure has sufficient density (p). If the visible light transmission values (69) are in excess of the visible light transmission value thresholds (70), the bonding tray quality control module (60) can report that the indirect bonding tray (2) failed the bonding tray inspection.

Brackets. Now, with primary reference to FIG. 1, a dental bracket (3) can include one or more of: a bracket base (71), a bracket body (72), a pair of tie wings (73), a bracket hook (74), or other bracket features. The bracket base (71) can have a bracket base first side (75) adapted to or configured to attach to a tooth (19) in the upper dental arch (20) or lower dental arch (21) and a bracket base second side (76). The bracket body (72) can have a bracket body first end (77) secured to the bracket base second side (76) of the bracket base (71) and a bracket body second end (77'). Outwardly projecting from the bracket body second end (77") can be a pair of tie wings (73). The bracket (3) can be made from any one or more of a variety of rigid materials, such as: a metal, a plastic, a ceramic, or other like rigid material. The orthodontic treatment data (17) can includes an instruction for placement of a bracket (3) at a particular location on a tooth in the upper dental arch (20) or the lower dental arch (21) (also referred to as "bracket placement") and bracket structure to deliver prospective forces of correction to move one tooth or teeth (19) in an upper dental arch (20) and/or a lower dental arch (21) of a patient (P) from instant malocclusion to a prospective occlusion (collectively referred to as "tooth movement (TM)") including one or more of: tooth body movement, tooth tipping movement, tooth intrusion movement, tooth extrusion movement, tooth torquing movement, tooth uprighting movement, and tooth rotation movement.

Bracket Library. Now, with primary reference to FIG. 3, in particular embodiments, a plurality of brackets having incremental variation in bracket structure to afford one or more of: bracket placement and/or tooth movement over the entire useful range of orthodontic mechanics can be assembled in a bracket combinatory library (78). The orthodontic practitioner can prescribe a bracket (3) for each tooth in the upper dental arch (20) and/or lower dental arch (21) of the patient (P) and transmit the bracket prescription (23) as part of the orthodontic treatment data (17) to the vendor user (44).

Bracket Selection. Now, with primary reference to FIG. 4, the program code (27) can further include a bracket selection module (79) which compares the requirements of the orthodontic treatment data (17) and/or bracket prescription (23) for each tooth (19) receiving treatment in the upper dental arch (20) and/or lower dental arch (21) of the patient (P). The bracket selection module (79) can function to select a bracket (3) for each tooth (19) receiving treatment from a plurality of brackets (3) or contained in a bracket combinatory library (78) that most closely matches the orthodontic treatment data (17) or bracket prescription (23). The bracket selection module (79) can further function to associate each selected bracket (3) with a corresponding bracket pocket (11) in the indirect bonding tray (2). In particular embodiments, a bracket selection module (79) can further depict on a display surface (36) or print a graphical representation of the indirect bonding tray (2) having each bracket pocket (11) correspondingly filled with the correct dental bracket (3) based on the orthodontic data (17) or bracket prescription (23).

Bracket Identification Marking. Now, with primary reference to FIGS. 1 and 5, each bracket (3) can include one or more bracket identification marks (80). The one or more bracket identification marks (80) can include one or more optically perceivable indicia (81) disposed on one or more surfaces of the bracket (3). The term "optically perceivable indicia (81)" means one or more marks that can be viewed by the eye or with optical components that allow humans or machines to identify and differentiate between bracket identification marks (80). The bracket identification mark (80) or the absence of a bracket identification mark (80) allows for optical identification of each bracket (3), or between a plurality of brackets (3) in bracket combinatory library (78). Optically perceivable indicia (81) can comprise one or more optically perceivable features that can occur on or be disposed on the surface of a bracket (3) that can be incrementally varied to correlate with corresponding incremental variance in the structure between a plurality of brackets (3). In particular embodiments, the optically perceivable indicia (81) can be an incremented range in one or more of: color (hue or shade), texture, light reflectance, light emission, or combinations thereof, which occurs on or can be disposed on the bracket (3). In the illustrative examples of FIGS. 1 and 5, a colored deposit (82) can be varied by one or both of hue (referring to a color such as red, yellow, blue) or shade (referring to color lightness or darkness). However, the illustrative example of a colored deposit (82) is not intended to be limiting with respect to other forms of optically perceivable indicia (81), such as texture, light reflectance, light emission, or combinations thereof, that can be incrementally varied over the entirety or part of the bracket (3).

Figure 5:
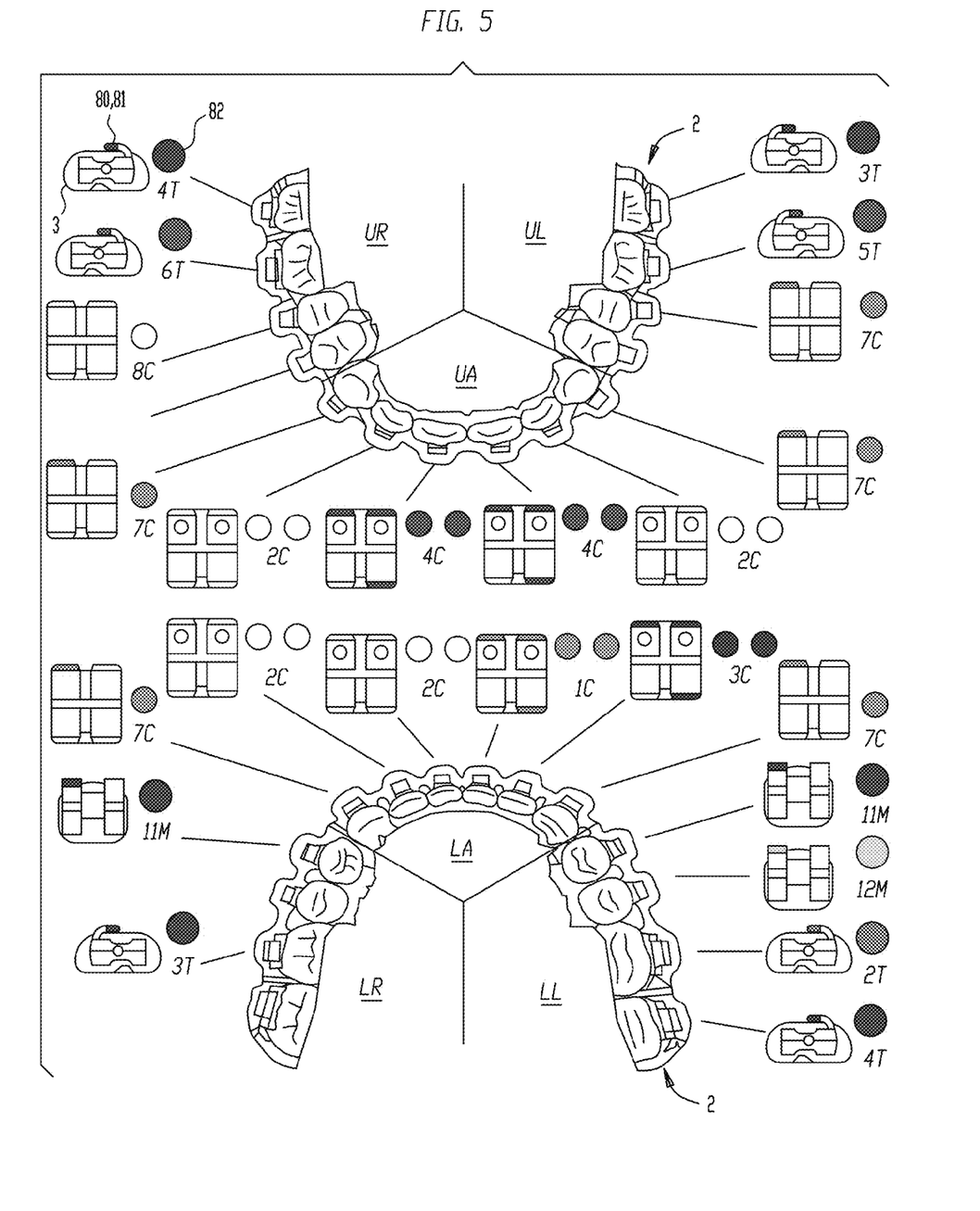
FIG. 5 illustrates an example of a dental bracket identification marking system.

In particular embodiments, the optically perceivable indicia (81) can be disposed on the gingival facing surface of the bracket (3) to allow optical recognition of the optically perceivable indicia (81) on the brackets (3) disposed in an indirect bonding tray (2). In certain variations, the optically perceivable indicia (81) can be disposed on the gingival facing margin of a first tie wing (73') or a second tie wing (73") of the pair of tie wings (73), or on the gingival facing margin of both the first and the second tie wing (73', 73"). In other particular embodiments, the optically perceivable indicia (81) can be located on the bracket body (72) between the gingival facing edge of a first or second tie wing (73', 73") of the pair of tie wings (73). In further particular embodiments, the optically perceivable indicia (81) can be located on the gingival facing portion of the bracket hook (74) or bracket base (71). While the illustrative example, identifies a particular bracket (3) in a bracket combinatory library (78) based on the placement and color of an optically perceivable indicia (81) on the gingival surfaces of a bracket (3); this is not intended to preclude any objective correlation system which allows differential optical identification of each bracket (3) in plurality of brackets (3) or each bracket (3) in a bracket combinatory library (78).

Bracket Identification Marking Database. Now, with primary reference to FIG. 1, particular embodiments can include a bracket identification marking database (83) containing digital representations (84) of the bracket identification marks (80) correlated with each bracket (3) in a plurality of brackets (3) or in a bracket combinatory library (78). The digital representations (84) of the bracket identification marks (80) can correlated with each of the plurality of brackets (3) selected to load into an indirect bonding tray (2) based on the digital model (22) of the indirect bonding tray (2).

Bracket Bonding Tray Loading. Now, primary reference to FIGS. 5 and 6, if the indirect bonding tray identification (58) correlates with the retrieved patient identifier (59), then the indirect bonding tray (23) or bonding tray segments (UR, UA, UL, LR, LA, LL) can be loaded with the brackets (3) selected by the bracket selection module (79). Each bracket (3) identified by the orthodontic treatment data (17) and selected by the bracket selection module (79) correspondingly fills a bracket pocket (11) in the indirect bonding tray (2). Each bracket (3) can be inserted into the bracket pocket (11) in the indirect bonding tray (2) with the optically perceivable indicia (81) upwardly facing or gingivally facing when the indirect bonding tray (2) engages the corresponding teeth of the patient (P).

Loaded Bracket Bonding Tray Quality Control. Now, with primary reference to FIG. 6, the indirect bonding tray (2) loaded with dental brackets (3) can be disposed on the bonding tray inspection platform (61). One or more illumination devices (63) can be utilized to illuminate the indirect bonding tray (2) loaded with brackets (3) on the inspection platform (61). Illumination enhances the bonding tray (2) surface structure including the structure of the bonding tray bracket pockets (11) and the brackets (3) loaded into each bracket pocket (11). As an example, one or more illumination devices (63) can direct light at one or more angles of incidence to the bonding tray (2) to provide illumination that sufficiently enhances the structure of the indirect bonding tray (2), the brackets (3) loaded into the indirect bonding tray (2), and the optically perceivable indicia (81) on the brackets (3) loaded in the indirect bonding tray (2). One or more image capture devices (29) (for example a camera, video camera, web camera, mobile phone camera, video phone) can capture one or more digital images (64) of the indirect bonding tray (2) loaded with dental brackets (3). The one or more digital images (64) composed of pixels can be converted by the bonding tray quality control module (60) into a continuous spatially distributed image model (65) including digital representations (84') of the bracket identification marks (80). The digital representations (84) of the bracket identification marks (80) associated with each of the dental brackets (3) loaded into bracket pockets (11) of the indirect bonding tray (2) can be compared to the digital representations (84") of the bracket identification marks (80) in the digital model (22) of the indirect bonding tray (2). The bonding tray quality control module (60) can then function to compare the digital representations (84) of the bracket identification marks (80) in the image model (65) to the digital representations (84) bracket identification marks (80) in the digital model (22) of the indirect bonding tray (2) of a patient (P). The bonding tray quality control module (60) can further function to report variances between the digital representations (84') of the bracket identification marks (80) in the image model (65) and the digital representations (84") of the bracket identification marks (80) in digital model (22) of the indirect bonding tray (2) of the patient (P). The variances between the digital representations (84') of the bracket identification marks (80) in the image model (65) and the digital representations (84") of the bracket identification marks (80) in digital model (22) of the indirect bonding tray (2) can be highlighted in a graphical representation of the indirect bonding tray (2) loaded with dental bracket (3) depicted on a display surface (36) of the vendor computing device (15). If a variance occurs between the digital representations (84) of the bracket identification marks (80) in the image model (65) and the digital representations (84) of the bracket identification marks (80) in digital model (22) of the indirect bonding tray (2) associated with a patient (P) the variance may be attributable to one or more of: an incorrect indirect bonding tray (2) being positioned on the inspection platform (61); an incorrect or misread bonding tray identification (58) associated with the indirect bonding tray (20) positioned on the inspection platform (61); one or more incorrect dental brackets (3) inserted into one or more bracket pockets (11) in the indirect bonding tray (2). The identification of variances between the digital representations (84) of the bracket identification marks (80) in the image model (65) and the digital representations (84) of the bracket identification marks (80) in digital model (22) of the indirect bonding tray (2) associated with a patient (P) affords substantial advantages compared to conventional methods of processing of orthodontic treatment data (17) and manufacture of orthodontic appliances (18) by reduction in structural defects and reduction in variances between the digital model (22) generated from the orthodontic treatment data (17) and the tangible orthodontic appliances (18) produced from the digital model (22), including one or more of: a reduction in structural defects in indirect bonding trays (2), and a reduction in variances between the digital model (22) of an indirect bonding tray (2) loaded with dental brackets (3) associated with a patient (P) and the tangible manufactured indirect bonding tray (2) loaded with dental brackets (3). In sum, embodiments of the invention elevate the product quality of orthodontic appliances (18) prior to shipment and can correspondingly reduce returned orthodontic appliances (18) and the associated costs of orthodontic appliance (18) replacement.

Figure 7:
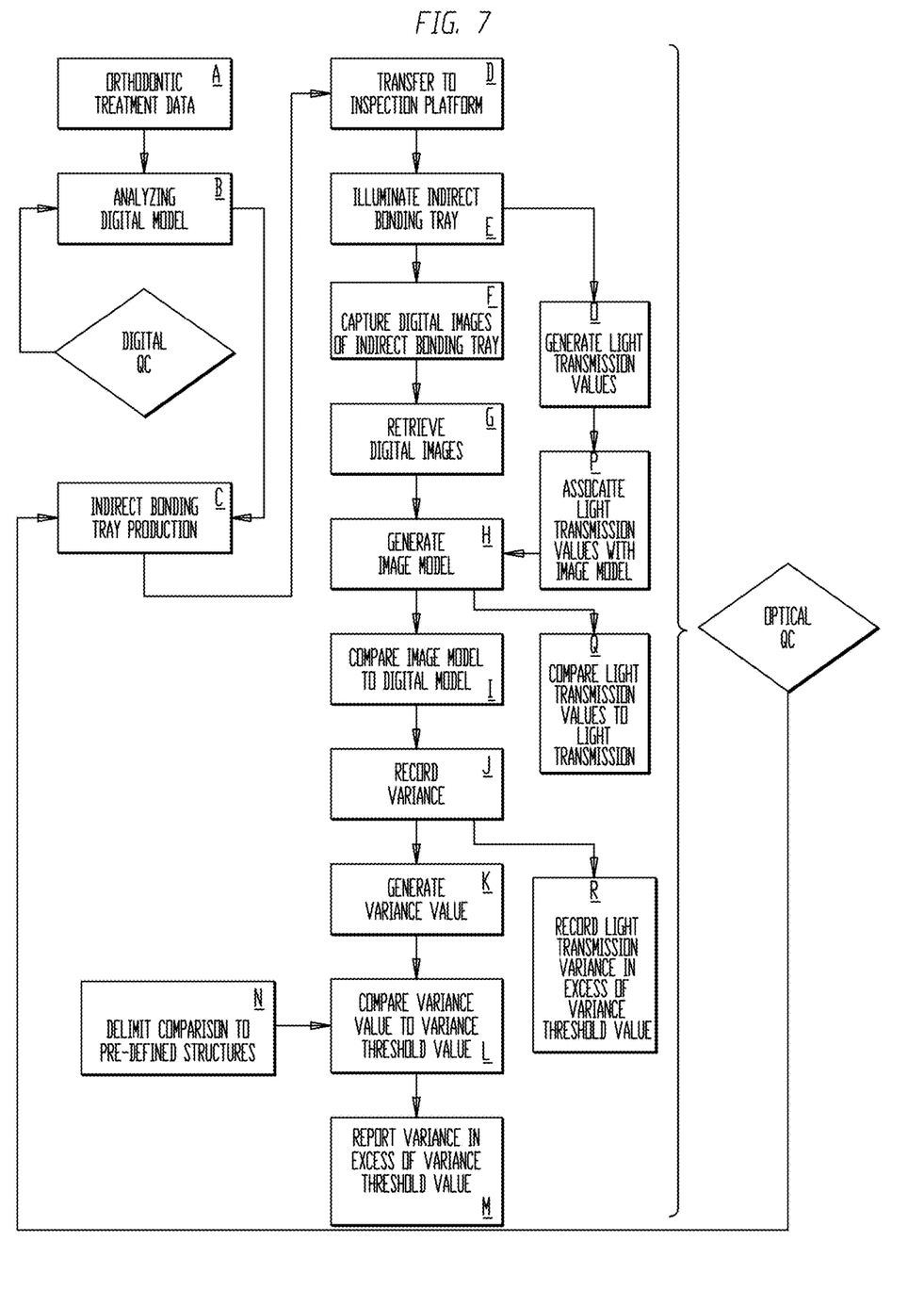
FIG. 7 is a block flow diagram of a particular embodiment of a method of quality control in the manufacture of indirect bonding trays.
Figure 8:
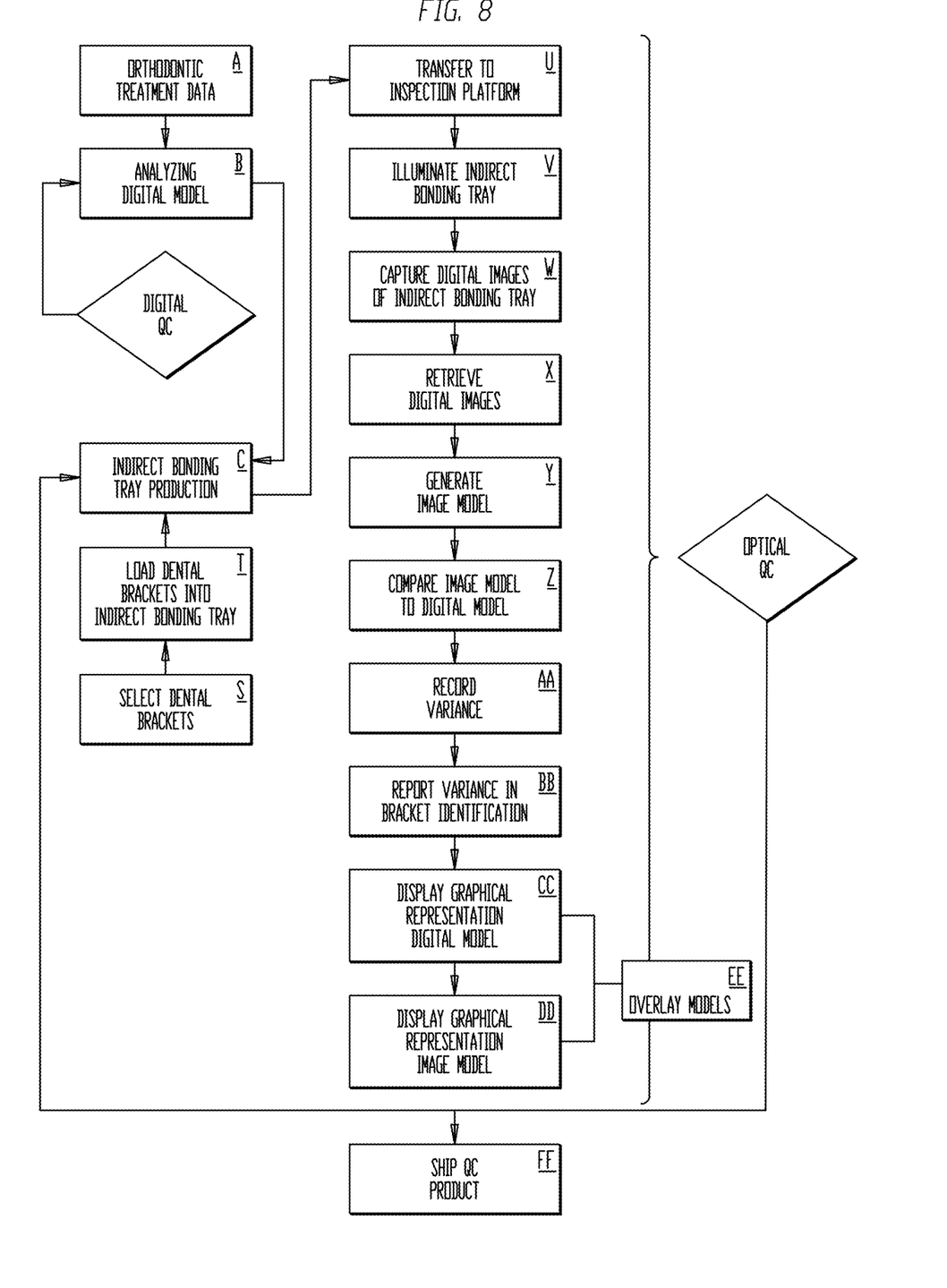
FIG. 8 is a block flow diagram of a particular embodiment of a method of quality control of an indirect bonding tray loaded with dental brackets each having one or more bracket identification marks.

Now, with primary reference to FIG. 7, which depicts a block flow diagram of a method of manufacturing and quality control of an indirect bonding tray and an indirect bonding tray loaded with dental brackets. The method of manufacturing of the indirect bonding tray can include one or more of: obtaining orthodontic treatment data (17) directly or through an orthodontic treatment data exchange network (4)(Block A) which can include one or more of a bracket prescription (23), a digital model (22) of the upper dental arch (20) and/or a lower dental arch (21), a digital model (22) of an indirect bonding tray (2); analyzing one or more the digital models (22) to generate computer instructions to operate a three dimensional materials deposition apparatus (Block B); operating of three dimensional materials deposition apparatus to produce a indirect bonding tray (2) (Block C); disposing the indirect bonding tray (2) on an inspection platform (61) (Block D); illuminating the indirect bonding tray disposed on the inspection platform (61) with one or more illumination devices (63) (Block E); capturing one or more digital images (64) of the indirect bonding tray (2) disposed on the inspection platform (61) with one or more image capture devices (29) (Block F); retrieving digital images (64) of an indirect bonding tray (2) captured by the one or more image capture devices (29) from a non-transitory computer readable media (26) (Block G); generating an image model (65) of the indirect bonding tray (2) based on said digital images (64) (Block H); comparing the image model (64) of the indirect bonding tray (2) to the digital model (22) of the indirect bonding tray (2) (Block I); recording variances between said image model (65) of the indirect bonding tray (2) compared to the digital model (22) of the indirect bonding tray (2) (Block J). In particular embodiments, the method can further include associating a variance value (67) with each of the variances between the image model (64) of the indirect bonding tray (2) to the digital model (22) of the indirect bonding tray (2) (Block K), comparing each variance value (67) to a variance value threshold (68) (Block L); and reporting each variance value which exceeds the variance value threshold (Block M). The method can further include delimiting the comparison between the image model (64) of said indirect bonding tray (2) to the digital model (22) of the indirect bonding tray (2) to pre-defined structural features (66) of the indirect bonding tray (2), wherein optionally the pre-defined structural features (66) of the indirect bonding tray (2) include one or more tooth pockets (10) or one or more bracket pockets (11) of the indirect bonding tray (2) (Block N). In particular embodiments, the method can further include generating light transmission values based on an amount of light passing through said indirect bonding tray disposed on said inspection platform (Block O), associating said light transmission values with said image model of said indirect bonding tray (Block P), comparing the light transmission values with light transmission thresholds (Block Q); and recording the light transmission values which exceed the light transmission thresholds, thereby evaluating density of the indirect bonding tray (2) (Block R).

In particular embodiments, the method can further include selecting the plurality of dental brackets (3) to fill each of said plurality of bracket pockets (11) in the indirect bonding tray (2), wherein each of the plurality of dental brackets (3) having a bracket identification mark (80) optically perceivable by the one or more image capture devices (29) (Block S) and loading each of said bracket pockets (11) of the indirect bonding tray (2) with said plurality of dental brackets (3) having said bracket identification mark (80) (Block T).

The method can further include obtaining the orthodontic treatment data including the digital model (22) of said indirect bonding tray (2) including said bracket pockets each including one of said plurality of dental brackets having said bracket identification mark (Block A), disposing the indirect bonding tray (2) including one of said plurality of dental brackets having said bracket identification mark on an inspection platform (61) (Block U); illuminating the indirect bonding tray disposed on the inspection platform (61) with one or more illumination devices (63) (Block V); capturing one or more digital images (64) of the indirect bonding tray (2) on the inspection platform (61) (Block W), retrieving the one or more digital images (64) including the bracket pockets (11) each loaded with one of the plurality of dental brackets (3) having a bracket identification mark (80) (Block X), generating an image model based on said digital images of said indirect bonding tray including said bracket pockets each loaded with one of said plurality of dental brackets having said bracket identification mark (Block Y); comparing the image model of said indirect bonding tray to said digital model of said bonding tray (Block Z); and recording variances between said bracket identification mark on each of said plurality of dental brackets in said image model of said indirect bonding tray corresponding to said bracket identification mark on each of said plurality of dental brackets in said digital model of said indirect bonding tray (2) (Block AA), reporting the variances between said bracket identification mark on each of said plurality of dental brackets in said image model of said indirect bonding tray corresponding to said bracket identification mark on each of said plurality of dental brackets in said digital model of said indirect bonding tray (Block BB).

In particular embodiments, the method can further include depicting a graphical representation of the digital model of the indirect bonding tray (2) including the bracket pockets (11) each loaded with one of the plurality of dental brackets (3) having a bracket identification mark (80) on a display surface (36) (Block CC), depicting a graphical representation of the image model (64) of the indirect bonding tray (2) including the bracket pockets (11) each loaded with one of the plurality of dental brackets (3) having a bracket identification mark (80) on the display surface (36) (Block DD), and optionally, overlaying of the digital model (22) and said image model (64) on said display surface (36), and depicting visual indicia of the variances in said digital model (22) overlaid with said image model (64) on said display surface (36) (Block EE). The method can further include packaging and shipping of the indirect bonding tray loaded with dental brackets (3) (Block FF)

As can be easily understood from the foregoing, the basic concepts of the present invention may be embodied in a variety of ways. The invention involves numerous and varied embodiments of a dental bracket tray and dental bracket quality control system and methods for making and using such dental bracket tray and dental bracket quality control system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "connector" should be understood to encompass disclosure of the act of "connecting"—whether explicitly discussed or not—and, conversely, were there is a disclosure of the act of "connecting", such a disclosure should be understood to encompass disclosure of a "connector" and even a "means for connecting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the embodiments of the quality control system herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A quality control system, comprising:
  a processor communicatively coupled to a non-transitory computer readable media containing a program code executable to:
    retrieve a digital model of an indirect bonding tray under inspection, said digital model of said indirect bonding tray including bracket pockets loaded with dental brackets each having a bracket identification mark;
    receive digital images of said indirect bonding tray under inspection, said digital images including said bracket pockets loaded with said dental brackets each having said bracket identification mark;
    generate an image model based on said digital images of said indirect bonding tray including said bracket pockets loaded with said dental brackets each having said bracket identification mark;
    compare said image model of said indirect bonding tray including said bracket pockets loaded with said dental brackets each having said bracket identification mark to said digital model of said bonding tray loaded with said dental brackets each having said bracket identification mark; and
    record variances between said image model of said indirect bonding tray including said bracket pockets loaded with dental brackets each having said bracket identification mark and said digital model of said indirect bonding tray including said bracket pockets loaded with dental brackets each having said bracket identification mark.

2. The system of claim 1, wherein said program code further executed to report said variances between each said bracket identification mark in said image model of said indirect bonding tray and each said bracket identification mark in said digital model of said indirect bonding tray.

3. The system of claim 1, wherein said program code further executed to select based on a bracket prescription said dental brackets each having said bracket identification mark.

4. The system of claim 3, wherein each of said dental brackets having said bracket identification mark selected from a dental bracket combinatory library.

5. The system of claim 4, wherein said bracket identification mark of each of said dental brackets disposed a gingival facing surface of said dental bracket.

6. A method of quality control, comprising:
  disposing an indirect bonding tray on an inspection platform;
  illuminating said indirect bonding tray disposed on said inspection platform with one or more illumination devices;
  capturing one or more images of said indirect bonding tray disposed on said inspection platform with one or more image capture devices;
  communicatively coupling a processor to a non-transitory computer readable media containing a program code, said program code executed under control of said processor to:
    generate a digital model of said indirect bonding tray based on orthodontic treatment data;
    receive digital images of an indirect bonding tray captured by said one or more image capture devices;
    generate an image model of said indirect bonding tray based on said digital images;
    compare said image model of said indirect bonding tray to said digital model of said indirect bonding tray; and
    record variances between said image model of said indirect bonding tray compared to said digital model of said indirect bonding tray.

7. The method of claim 6, further comprising executing said program code to compare an indirect bonding tray identification included in said digital model of said indirect bonding tray to said indirect bonding tray identification included in said image model.

8. The method of claim 7, further comprising executing said program code to report a variance between said indirect bonding tray identification included in said digital model of said indirect bonding tray to said indirect bonding tray identification included in said image model.

9. The method of claim 8, further comprising executing said program code to display a graphical user interface on a display surface to depict one or more of:
  a graphical representation of said digital model on a display surface;
  a graphical representation of said image model on said display surface;
  an overlay of said digital model and said image model on said display surface; and
  visual indicia of said variances in said digital model overlaid with said image model on said display surface.

10. The method of claim 8, further comprising executing said program code to:
  associate a variance value with each of said variances between said image model of said indirect bonding tray to said digital model of said indirect bonding tray;
  compare each said variance value to a variance value threshold; and
  report each variance value which exceeds said variance value threshold.

11. The method of claim 7, further comprising executing said program code to delimit comparison between said image model of said indirect bonding tray to said digital model of said indirect bonding tray to pre-defined structural features of said indirect bonding tray.

12. The method of claim 11, wherein said pre-defined structural features of said indirect bonding tray including one or more tooth pockets or one or more bracket pockets of said indirect bonding tray.

13. The method of claim 6, further comprising executing said program to:
   generate light transmission values based on an amount of light passing through said indirect bonding tray disposed on said inspection platform;
   associate said light transmission values with said image model of said indirect bonding tray;
   compare said light transmission values with light transmission thresholds; and
   report said light transmission values which exceed said light transmission thresholds.

14. The method of claim 6, wherein said orthodontic treatment data includes a bracket prescription.

15. The method of claim 14, wherein said bracket prescription prescribes a plurality of dental brackets to correspondingly fill each of a plurality of tooth pockets in said indirect bonding tray.

16. The method of claim 15, further comprising executing said program code to select said plurality of dental brackets to fill each of said plurality of tooth pockets in said indirect bonding tray, wherein each said plurality of dental brackets having a bracket identification mark optically perceivable by said one or more image capture devices.

17. The method of claim 16, wherein each of said plurality of dental brackets having said bracket identification mark selected from a bracket combinatory library.

18. The method of claim 16, further comprising loading each of said bracket pockets of said indirect bonding tray with said plurality of dental brackets having said bracket identification mark.

19. The method of claim 18, further comprising executing said program code to:
   generate said digital model of said indirect bonding tray including said bracket pockets each including one of said plurality of dental brackets having said bracket identification mark;
   retrieve said digital model of said indirect bonding tray including said bracket pockets each including one of said plurality of dental brackets having said bracket identification mark;
   receive digital images of said indirect bonding tray on said inspection platform, said one or more digital images including said bracket pockets each loaded with one of said plurality of dental brackets having a bracket identification mark;
   generate an image model based on said digital images of said indirect bonding tray including said bracket pockets each loaded with one of said plurality of dental brackets having said bracket identification mark;
   compare said image model of said indirect bonding tray to said digital model of said bonding tray; and
   record variances between said bracket identification mark on each of said plurality of dental brackets in said image model of said indirect bonding tray corresponding to said bracket identification mark on each of said plurality of dental brackets in said digital model of said indirect bonding tray.

20. The method of claim 19, further comprising executing said program code to report said variances between said bracket identification mark on each of said plurality of dental brackets in said image model of said indirect bonding tray corresponding to said bracket identification mark on each of said plurality of dental brackets in said digital model of said indirect bonding tray.

* * * * *